Dec. 31, 1940.  M. HILMER ET AL  2,227,258
FLUID CONTROL DEVICE
Filed Feb. 23, 1939  4 Sheets-Sheet 2

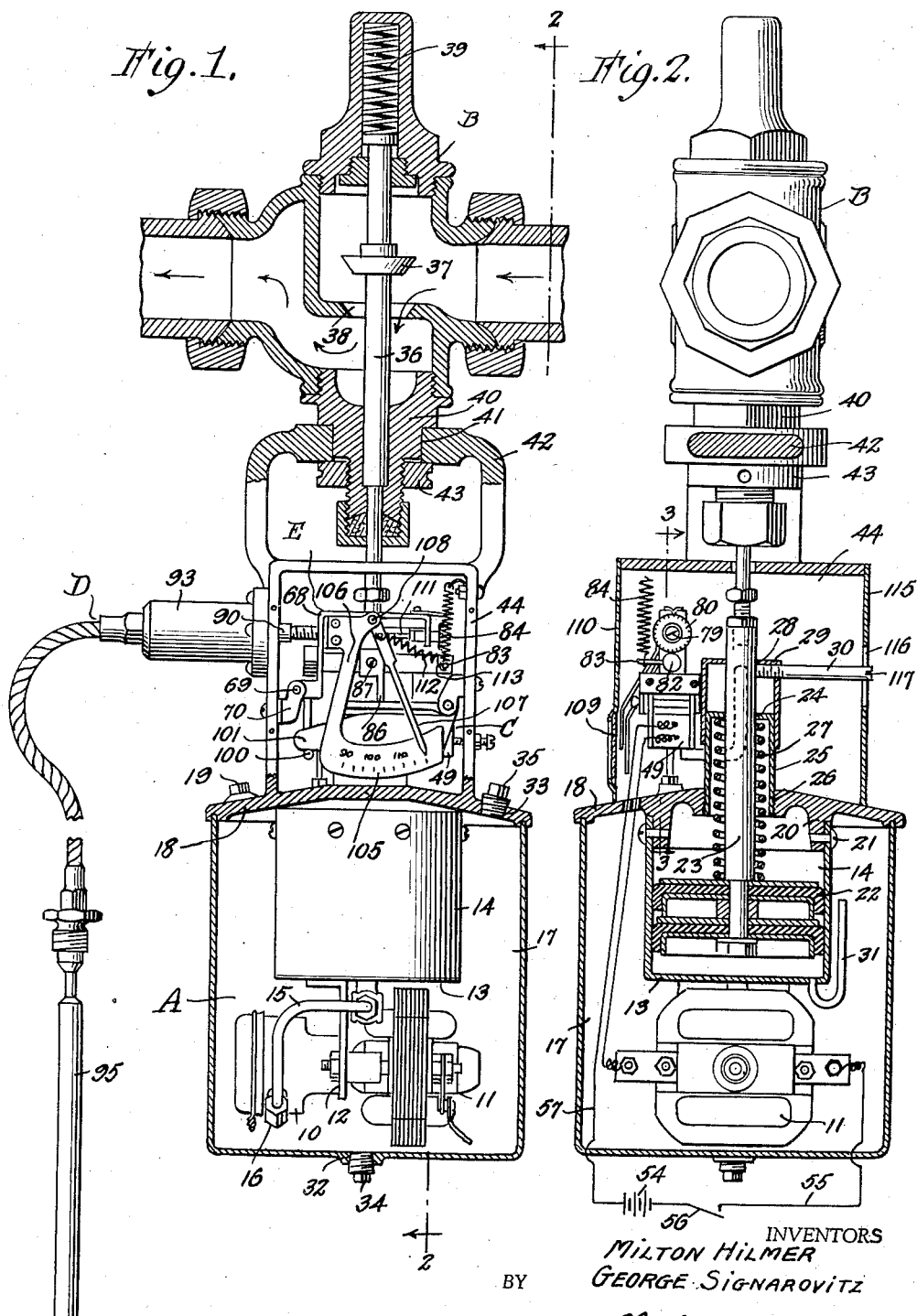

INVENTORS
MILTON HILMER
GEORGE SIGNAROVITZ
BY Clarke Ott ATTORNEYS

Dec. 31, 1940.    M. HILMER ET AL    2,227,258
FLUID CONTROL DEVICE
Filed Feb. 23, 1939    4 Sheets-Sheet 3
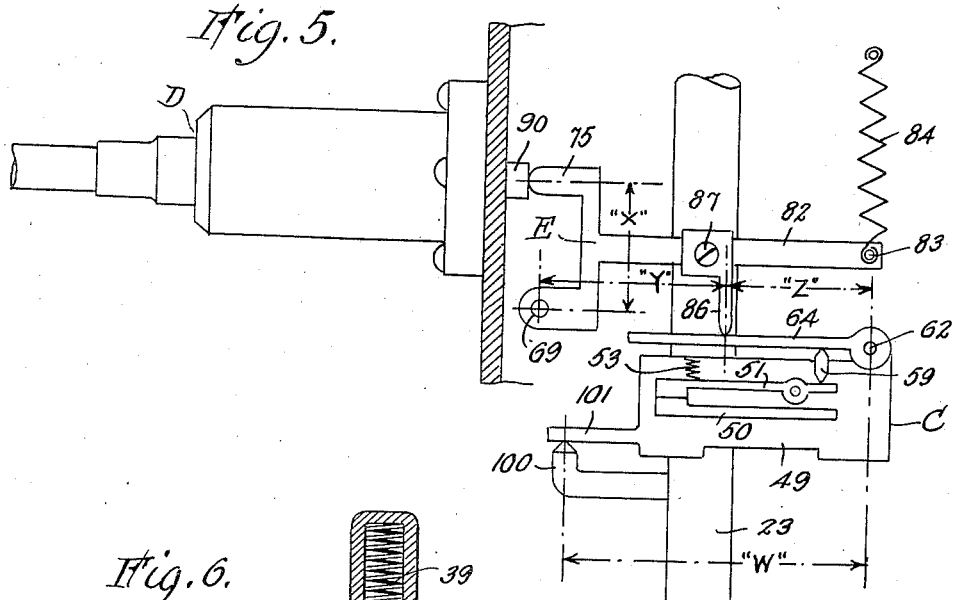
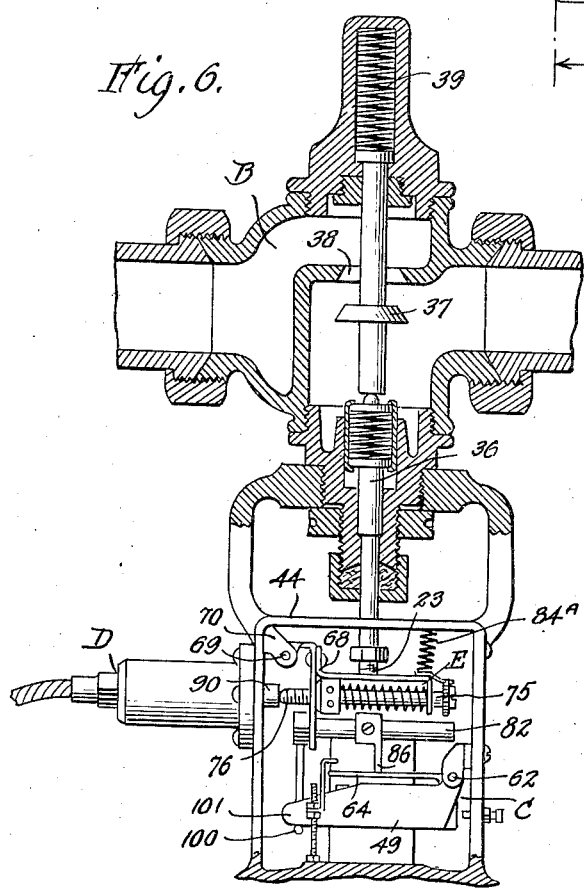
INVENTORS
MILTON HILMER
GEORGE SIGNAROVITZ
BY
Clark & Ott ATTORNEYS Dec. 31, 1940.                M. HILMER ET AL                    2,227,258
                              FLUID CONTROL DEVICE
                              Filed Feb. 23, 1939            4 Sheets-Sheet 4
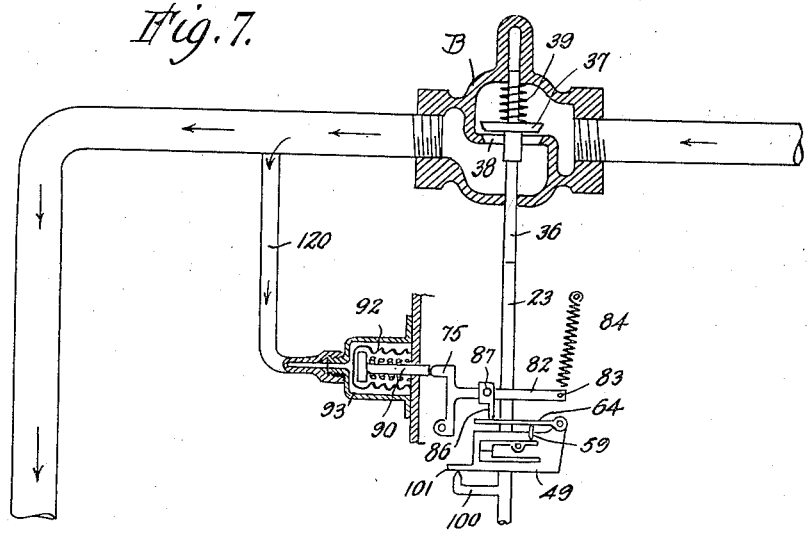
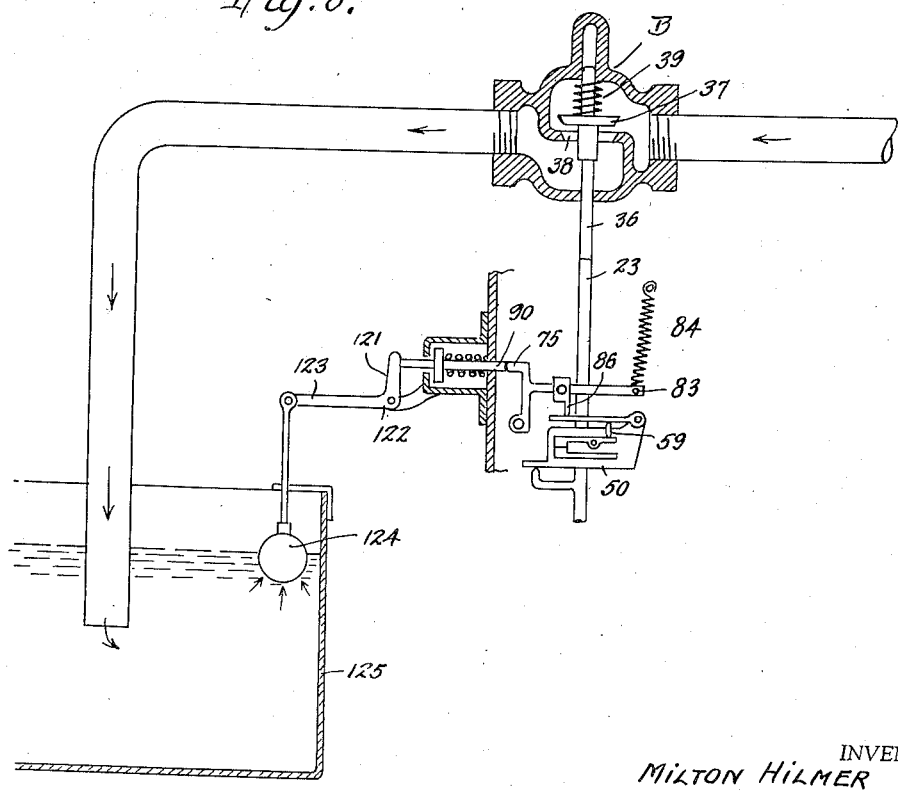
INVENTORS
MILTON HILMER
BY  GEORGE SIGNAROVITZ
Clark & Ott ATTORNEYS Patented Dec. 31, 1940

2,227,258

UNITED STATES PATENT OFFICE 2,227,258

FLUID CONTROL DEVICE

Milton Hilmer, Center Valley, and George Signarovitz, Allentown, Pa., assignors to Sarco Company, Inc., New York, N. Y., a corporation of New York Application February 23, 1939, Serial No. 257,796

7 Claims. (Cl. 137—139)

This invention relates to control devices and has particular reference to an improved device for automatically regulating the flow of a fluid in accordance with the requirements for which the fluid is employed.

The invention has in view a control device for the automatic regulation of the flow of a fluid such as a gas, a liquid or a heat exchange medium by means reciprocating between limits to regulate the flow of the fluid between the maximum and complete cessation thereof and which means is normally tensioned for movement in one direction and is propelled in the opposite direction by a motor driven means, the motor of which is rendered intermittent in its action so as to automatically arrest the travel of the reciprocating means at any point between its limits of movement to thereby control the flow of the fluid.

The invention further comprehends the automatic regulation of the flow of a fluid by the automatic control of a variable port through which the fluid passes by means reciprocating between limits to regulate the port opening and which reciprocating means is normally tensioned for movement in one direction and propelled in the opposite direction by motor driven hydraulic pressure creating means, the motor of which is rendered intermittent in its action by an electric switch which is actuated to make and break the circuit with the motor by pressure induced by the fluid and by the movement of the reciprocating means in said opposite direction to thereby discontinue the propelling operation of the hydraulic pressure creating means at any one of an infinite number of positions of the reciprocating means between the limits of its movement.

The invention further embodies a control device for the automatic regulation of the flow of a fluid through a self-opening or a self-closing control valve and which device is so constructed and arranged as to permit of adjustment thereof to regulate the extent of travel of the valve plug and by which different degrees of travel of the valve plug may be obtained for the same range of change in the fluid so as to render the device applicable for different sizes of valves having varying limits of valve plug travel or for regulating the sensitivity of the device so that the range of change in the fluid to effect the full opening or closing of the valve plug can be varied.

The invention is applicable for controlling the temperature of a substance by the automatic regulation of the flow of a heat exchange medium for heating or chilling the same and in which instance a thermostat element responsive to changes of temperature in the substance functions to shift the position of an abutment against which the switch is impinged for actuation thereof to control the circuit with the motor of the hydraulic pressure creating means.

The invention is also applicable to regulate the flow of a fluid by means responsive to the pressure thereof which functions to shift the position of an abutment against which the switch is to be impinged for actuation thereof to control the circuit with the motor of the hydraulic pressure creating means.

The invention is furthermore applicable to the regulation of the flow of a liquid by means responsive to the level thereof for similarly positioning an abutment against which the switch is impinged for actuation thereof to control the circuit with the motor of the said hydraulic pressure creating means.

With the foregoing and other objects in view, reference is now made to the following specification and the accompanying drawings in which there is disclosed a preferred embodiment of the invention, adapted to several of its various uses.

In the drawings:

Fig. 1 is a side view illustrating a temperature control device constructed in accordance with the invention, with parts broken away and shown in section to disclose the underlying structure.

Fig. 2 is a vertical sectional view taken approximately on the line indicated at 2—2 in Fig. 1.

Fig. 5 is a fragmentary diagrammatic view illustrating the leverage action of the thermostatically controlled switch means for a normally closed control valve.

Fig. 6 is a fragmentary vertical sectional view showing the temperature control device associated with and controlling a normally opened valve.

Fig. 7 is a diagrammatic view of a fluid flow control device which is operable by the pressure of the fluid for shifting the switch abutment.

Fig. 8 is a similar view illustrating a liquid flow control device having a switch abutment operated by the level of the liquid.

Figure 3:
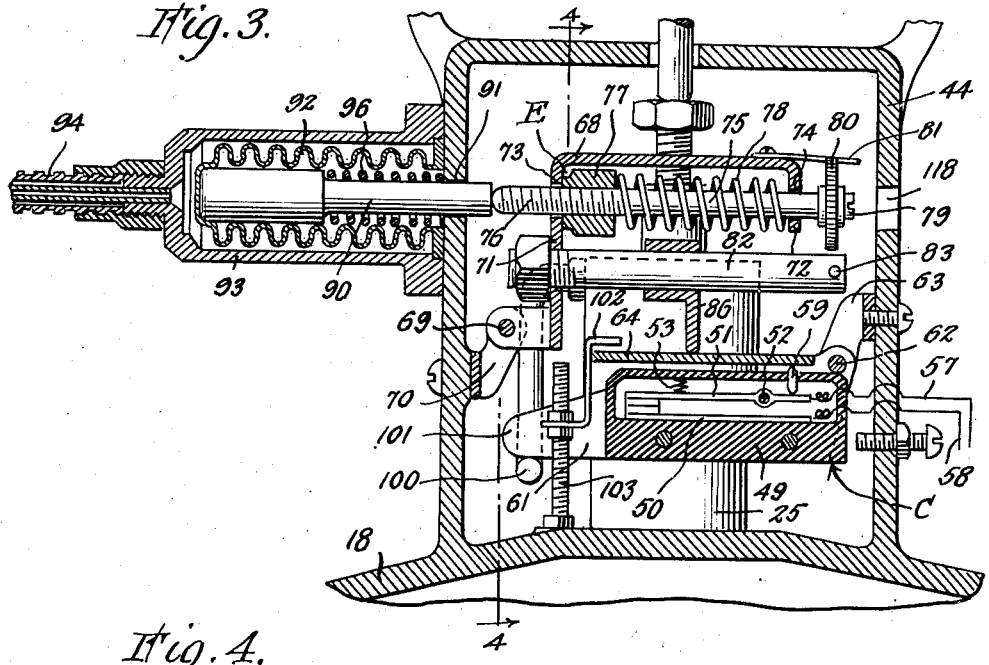
Fig. 3 is an enlarged fragmentary sectional view taken approximately on the line 3—3 of Fig. 2.
Figure 4:
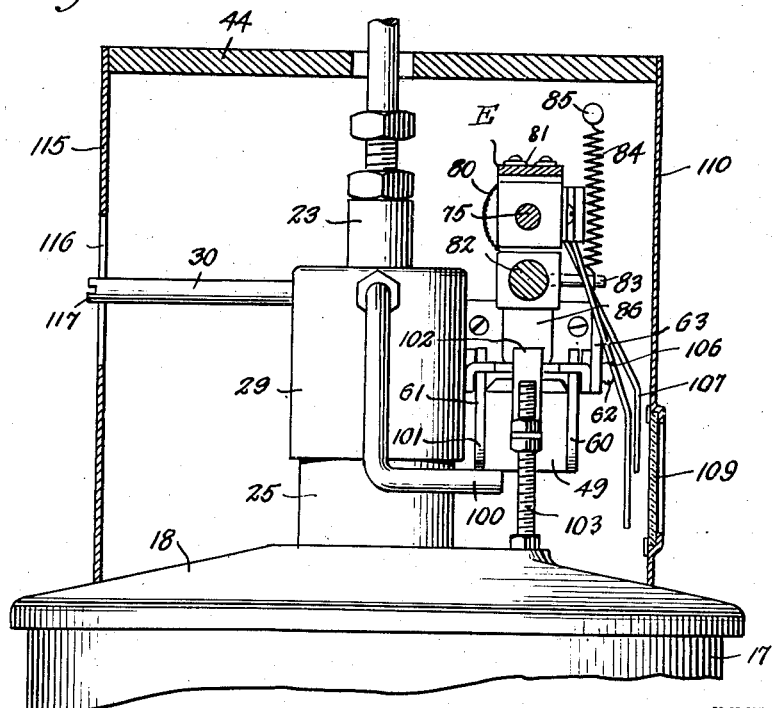
Fig. 4 is a fragmentary sectional view taken approximately on the line 4—4 of Fig. 3.

When the device is employed for temperature control, as illustrated in Figs. 1 to 6 inclusive, of the drawings, the same includes an electrically driven power means indicated generally by the reference character A for effecting actuation in one direction of the valve disk of a control valve B for regulating the flow therethrough of a heat exchange medium for heating or chilling a substance, the temperature of which is to be controlled. The device also includes an electrical switch means indicated generally by the reference character C for rendering the power means A active and inactive, a thermostatic means indicated generally by the reference character D and an adjustable abutment means E actuated thereby and interposed between said thermostatic and switch means for positioning said abutment means so as to control the switch means C.

The power means A includes a pump 10 and an electric motor 11 coupled to the rotor of the pump and which pump and motor are supported by an angle bracket 12 secured to and depending from the underside of the lower head 13 of a piston cylinder 14. A conduit 15 connects the discharge port 16 of the pump with the piston cylinder 14 through the lower head 13 thereof and the pump and motor together with the cylinder 14 are housed within a casing 17 which also provides an oil reservoir in which the pump and motor are immersed and which oil is forced by the pump into the piston cylinder 14 to create a hydraulic pressure therein.

The casing 17 is provided with a cover 18 which is secured in sealing relation thereon by the bolts 19 and which is formed with a depending annular flange 20 snugly fitted within the upper end of the cylinder 14 and to which the cylinder is secured by bolts 21. Mounted for reciprocatory movement within the cylinder 14 is a piston 22 secured to the lower end of a piston rod 23 which extends upwardly through a guide opening 24 in the upper end wall of an inverted cup-shaped member 25 secured to the cover 18 in the threaded opening 26 thereof. A coiled expansion spring 27 surrounds the piston rod 23 and is interposed between the piston 22 and the end wall of the inverted cup-shaped member 25 and which spring tensions the piston against the hydraulic pressure produced in the cylinder 14 between the end wall 13 thereof and the lower end of the piston by the oil pumped therein. The piston rod 23 also protrudes through an opening 28 in the upper end wall of an inverted cup-shaped member 29 which is secured thereon by a set screw 30 and which cup-shaped member is mounted for telescopic sliding engagement with the cup-shaped member 26.

The cylinder 14 is provided with a discharge pipe 31 opening into the casing 17 and through which the oil in the cylinder is returned to the casing. The casing 17 is also provided with a drain opening 32 in the bottom wall thereof and an oil admission opening 33 in the cover 18 which are respectively closed by screw plugs 34 and 35.

The hydraulic pressure built up in the cylinder 14 by the pumping of the oil thereinto effects upward movement of the piston 22 and piston rod 23 to move the valve stem 36 of the valve B upwardly and the valve disk or plug away from the valve seat if the valve is of the normally closed type or towards the valve seat if the same is of the normally opened type to thereby regulate the flow therethrough of the heat exchange medium.

As illustrated in Figs. 1 to 5 inclusive, the valve B is of the normally closed type, that is, the valve disk 37 is normally maintained in contact with the valve seat 38 by the spring 39. The valve casing has a reduced portion 40 seated in an opening 41 in a yoke 42 and is secured thereto by a nut 43 engaging a reduced threaded extension so as to dispose the valve stem 36 in axial alignment with the piston rod 23, the yoke 42 being carried by a housing 44 which is cast integral with the cover 18.

The electrical switch means C includes a circuit breaker designated generally by the reference character 49 which may be of any desired type and which, as illustrated, consists of an insulated housing having therein a fixed contact element 50 and a pivoted contact element 51 fulcrumed as at 52 and normally urged by a spring 53 into engagement with the fixed contact element. The circuit breaker is arranged in a circuit which includes a source of current supply 54 having a conductor 55 leading from one pole thereof and connected with one side of the motor and having interposed therein a starting switch 56. A conductor 57 leads from the other pole thereof and is connected with the movable contact 51 of the circuit breaker, while a conductor 58 leads from the fixed contact 50 of the circuit breaker to the other side of the motor. The circuit breaker is provided with an actuator pin 59 which engages with the pivoted contact element 51, extends through the casing and is adapted upon inward movement to separate the contact elements for breaking the circuit. The circuit breaker 49 is rigidly attached to and supported in a pair of arms 60 and 61 which are pivoted by a fulcrum pintle 62 to a bracket 63 carried by the housing 44. The switch means C also includes a rock lever 64 which is also pivotally carried by the fulcrum 62 for swinging movement with the circuit breaker 49 and relative thereto for shifting the actuation pin 59 inwardly for breaking the circuit.

The adjustable abutment means E includes a yoke 68 pivotally attached by a fulcrum pintle 69 to a bracket 70 carried by the housing 44. The yoke 68 is proivded with spaced parallel legs 71 and 72 having aligned apertures 73 and 74 through which a thrust rod 75 extends, the same being journaled in the opening 74 and freely passing through the opening 73. The thrust rod is threaded as at 76 and threadedly engages through a nut 77 between which and the apertured leg 72 a coiled expansion spring 78 is interposed in surrounding relation to the thrust rod for normally urging the nut 77 into engagement with the leg 71 of the yoke. The opposite end of the thrust rod is formed with a kerfed head 79 by means of which the thrust rod is rotated to adjust the same axially. The thrust rod adjacent the kerfed head has secured thereto a disk 80 having a knurled periphery with which a detent spring 81 engages to retain the thrust rod in axially adjusted position against accidental or unintentional movement.

The leg 71 of the yoke 68 is also provided with a stud 82 which is disposed below and in parallel spaced relation to the thrust rod 75 and said stud adjacent its free terminal is provided with a laterally projecting pin 83 to which is attached a coiled contractile spring 84, the opposite end of which is anchored as at 85 to the housing 44 in an elevated position so that the spring 84 normally exerts a tension to swing the yoke 68 upwardly while tensioning the same against downward movement. A depending abutment finger 86 is mounted on the stud 82 for adjustment axially thereon and is retained in adjusted position by a set screw 87.

The thermostatic device D includes a plunger 90 which is mounted in axial alignment and in engagement with the thrust rod 75 at one side of the housing 44 with the terminal of said plunger protruding through an opening 91 in the housing. The plunger is projected by means of the expansion of a thermal fluid which acts upon a bellows 92 in the head 93, a conductor tubing 94 connecting the head 93 with a bulb 95 containing the thermal fluid and which bulb is immersed in the substance, the temperature of which is influenced by the heat exchange medium which has passed through the control valve B. The projection of the plunger 90 effects, through its engagement with the thrust rod 75, downward swinging of the yoke 68 against the tension of the spring 84 with the abutment finger 86, the spring 84 swinging the yoke upwardly as the plunger 90 is retracted by contraction of the thermal fluid.

A circuit breaker actuating leg 100 is secured to the inverted cup-shaped member 29 which is carried by the piston rod 23 and the circuit breaker 49 is provided with a projection 101 which is disposed above the free end of the leg 100 so that when the piston rod is moved upwardly by the electrically actuated power means A the leg 100 engages the projection 101 and swings the circuit breaker 49 and rock lever 64 upwardly, which lever, upon impingement against the finger 86, depresses the pin 59 to break the circuit and discontinue the operation of the motor 11 and pump 10.

When the operation of the motor 11 and pump 10 is thus discontinued, the upward opening movement of the valve plug 37 will cease and the spring 27 will function to move the piston 22 downwardly, thereby forcing the oil within the cylinder 14 through the discharge pipe 31 into the casing 17, the restricted flow of the oil through the pipe 31 serving to retard the downward movement of the piston so that the same is gradually lowered.

Coincident with the downward movement of the piston and piston rod, the valve spring 39 operates to gradually move the valve plug 37 towards the valve seat 38. However, the leg 100 moving downwardly with the piston and piston rod will permit of gravitational swinging movement of the circuit breaker 49 to a position which normally closes the circuit thus again initiating the starting of the motor and pump. This intermittent opening and closing of the circuit breaker results in the valve plug being maintained in a substantially fixed position between fully opened and fully closed positions so long as the temperature of the substance being acted upon by the heat exchange medium remains constant. Furthermore, as soon as the temperature of the substance being acted upon by the heat exchange medium increases an infinitesimal amount, the plunger 90 moves the thrust rod 75 an infinitesimal amount causing the abutment finger 86 to move downwardly against the rock arm 64 which impinges the actuator pin 59 thereby keeping the circuit open until enough oil has drained out of the piston cylinder 14 through the discharge pipe 31 into the reservoir 17 to allow the actuating leg 100 to recede enough to again close the motor circuit. In this manner the piston rod 23 and the valve plug 37 will assume a new intermittent position. If the temperature of the substance being acted upon by the heat exchange medium decreases, the reverse of the operations described will take place. Thus it is that the valve plug may assume an infinite number of positions between the limits of its movement depending upon the temperature of the substance being acted upon by the heat exchange medium. In this manner true throttling action and not step interval action is obtained.

An emergency stop element 102 is provided which is carried by a threaded stem 103 mounted on the cover 18 so as to provide means for limiting the upward swinging movement of the lever 64 to thereby insure breaking of the circuit in the event of failure of the device to break the circuit and discontinue the operation of the motor 11 and pump 10 in the manner heretofore described. The said stop element further functions to limit the upward movement of the piston rod 23 when the temperature of the thermostatic means D is such as to render the abutment means E inactive.

The thrust rod 75 is axially adjusted in the yoke 68 to effect a change of position of the abutment finger 86 with reference to the plunger 90 so that the rock lever 64 and the circuit breaker 49 become effective at a new position upon upward movement of the piston rod 23 which causes the leg 100 thereof to swing the circuit breaker upwardly to thereby impinge the rock lever 64 against the abutment finger 86 in its new position thus effecting intermittent opening and closing of the circuit breaker as heretofore described at a relatively different temperature of the substance being acted upon by the heat exchange medium and with the valve plug 37 disposed in a new position with reference to its seat 38.

In order to visually indicate the setting of the thrust rod 75 in accordance with the desired temperature of the substance, a dial sector 105, graduated in degrees of temperature, is supported by a bracket arm 106 attached to the nut 77 and a pointer 107 is fulcrumed as at 108 to the dial bracket arm for swinging movement over the dial sector which is exposed through a window 109 in the front plate 110 of the housing 44. The pointer has pivotally connected therewith a push rod 111 which is slidably guided through an aperture in the leg 72 of the yoke 68 and which push rod bears against the disk 80. A coiled contractile spring 112 which is anchored at 113 to the stud pin 83 is connected with the pointer and normally swings the same to the right in Fig. 1 so that the push rod is maintained in engagement with the side face of the knurled disk 80. When the push rod 111 is moved to the left, the pointer is correspondingly moved to the left over the graduated dial sector 105 and vice versa. The housing 44 is also provided with a rear cover plate 115 which is slotted at 116 to expose the kerfed outer end 117 of the screw 30. The housing 44 is also provided with an opening 118 which provides means for gaining access to the kerfed head 79 of the push rod 75 for adjusting the same.

The adjustability of the abutment finger 86 on the stud 82 permits of the regulation of the sensitivity of the device as it will be understood that adjustment of the finger 86 to the left from the position shown in Fig. 3, will serve to retard the breaking of the circuit, while the adjustment of the finger 86 to the right from the position shown in Fig. 3 will serve to accelerate the breaking of the circuit. This is due to the fact that the vertical swinging movement of the abutment 86 is decreased in the first instance and increased in the latter instance specified. Thus assuming that the movement of the valve travel of a particular size valve, between fully opened and fully closed positions, is to be accomplished for a temperature change of 10° in the substance being acted upon, the finger 86 is adjusted to give the desired valve travel. However, if it is then determined that the valve must be opened to its full extent in less than a temperature change of 10° of the substance being acted upon, the finger 86 is moved to the right of its previous position thereby decreasing the mechanical advantage of the adjustable abutment means E, thus the same travel of the abutment finger 86 is accomplished for a correspondingly decreased movement of the plunger 90. Hence the same valve plug travel is obtained for a smaller temperature change of the substance being acted upon.

The finger 86 may also be adjusted so as to adapt the apparatus for use in conjunction with various sized valves having different degrees of valve travel, from fully closed to fully opened positions, for the same temperature change in the substance being acted upon. For instance, if the finger 86 is adjusted so that the valve plug will travel a predetermined distance from fully closed to fully opened positions for a temperature change of 10° and it is desired to employ a control valve B having a greater valve plug travel for the same temperature change, the finger 86 is adjusted to the left of its previous position or away from the actuator pin 59. This will be understood by reference to Fig. 5 wherein the switch means C and adjustable abutment means E are diagrammatically illustrated. Assuming that the plunger 90 of the thermostatic device D moves a unit distance for a predetermined temperature change and that for this temperature change the valve plug is to be fully opened from its closed position, the movement of the valve plug depends upon the distance that the actuating leg 100 moves to effect actuation of the circuit breaker 49 to break the motor circuit. The distance that the actuating leg 100 moves is equal to the movement of the plunger 90 multiplied by the term $$\frac{Y \times W}{X \times Z}$$

In this term, Y is the lateral distance from the pivot 69 to the bearing point of the finger 86 on the rock lever 64; W is the lateral distance from the fulcrum pintle 62 to a vertical line passing through the point of contact of the actuating leg 100 with the circuit breaker projection 101; X is the distance from the pivot 69 to a line passing centrally through the longitudinal axis of the thrust rod 75, and Z is the lateral distance from the contact point of the finger 86 with the rock lever 64 to a vertical line extending through the fulcrum pintle 62. The distances X and W are fixed, but the finger 86 can be adjusted to the right or left. Thus as the finger 86 is moved to the right, the distance Z is decreased and the distance Y is increased and the factor $$\frac{Y \times W}{X \times Z}$$

is increased and therefore, for unit travel of the plunger 90, the movement of the plunger rod 23 and the valve plug is incerased. By adjusting the finger 86 to the left, the distance Y is accordingly decreased and the distance Z is increased and the factor $$\frac{Y \times W}{X \times Z}$$

is decreased thereby decreasing the movement of the plunger rod 23 and the valve plug.

When the temperature control device is used in conjunction with a control valve B of the normally opened type as illustrated in Fig. 6 of the drawings, the yoke 68 is pivotally attached by a fulcrum pintle 69 to a bracket 70 carried by the housing 44 which fulcrum pintle 69 and bracket 70 are disposed above the thrust rod 75. A coiled expansion spring 84A is interposed between the top of the casing 44 and the free end of the yoke 68 to effect engagement of the thrust rod 75 with the plunger 90 of a thermostatic means D. Except for the fact that the yoke 68 is swung upwardly to dispose the abutment finger 86 in a new position for an increase in temperature of the substance and vice versa, and the valve 37 is moved towards its seat 38 in this form of the invention upon upward movement of the piston rod 23, the device as illustrated in Fig. 6 is the same and functions in the same manner as that previously described in Figs. 1 to 5 inclusive of the drawings.

When the invention is employed to regulate the flow of a fluid by means responsive to the pressure thereof, as diagrammatically illustrated in Fig. 7, the spring retracted plunger 90 is projected against the thrust rod 75 by the pressure of the fluid admitted from the control valve B through a branch pipe line 120 and against the bellows 92 of the head 93. The pressure of the fluid in this instance operates in the same manner as the pressure developed by the thermostatic means D in Figs. 1 to 6 of the drawings, to effect relative positioning of the abutment finger 86 against which abutment finger the circuit breaker is impinged to break the circuit with the motor of the electric motor driven pressure creating means.

Likewise, when the invention is utilized to regulate the flow of a liquid by means responsive to the level thereof, as illustrated diagrammatically in Fig. 8 of the drawings, the spring retracted plunger 90 is projected against the thrust rod 75 by the pressure of the arm 121 of a bell crank lever 122, the other arm 123 of which is connected to a float 124 controlled by the level of the liquid in a receptacle 125, and which liquid is supplied from the control valve B by a liquid supply line. The pressure of the arm 121 of the bell crank lever 122 induced by the level of the liquid operates in the same manner to effect relative positioning of the abutment finger 86 against which the circuit breaker is impinged to cause the breaking of the circuit with the motor of the electric motor driven pressure creating means.

The control valve B is employed herein in its broadest sense and is not intended to be limited to any particular type of valve, it being understood that the same applies to any device for controlling the flow of a fluid therethrough, such as a damper or the like.

What is claimed is:

1. In a control device, a reciprocatory rod shiftable in opposite positions to limit positions and adapted to engage with a valve element for controlling the flow of a fluid, means normally tensioning said rod for movement in one direction, electric motor driven means for shifting said rod in the opposite direction, an electric circuit including said motor and an electric switch, an abutment movable towards and away from said switch, abutment positioning controlling means normally urged in one direction and responsive to pressure exerted by the fluid for moving the same in the opposite direction, means connected to and movable with said rod by said motor driven means for moving the switch to cause the same to impinge against said abutment to effect actuation of the switch to thereby render the motor inactive, and means operating independently of said switch and functioning when the motor is inactive to permit said rod to be normally moved in said one direction so as to again effect actuation of the switch to render the motor active again and to thereby effect continual reciprocations of the rod at all positions of the abutment and during the intervals when the pressure induced by the fluid remains static and unchanged.

2. In a control device, a reciprocatory piston rod normally tensioned for movement in one direction and adapted to engage with a valve stem for controlling the flow of a fluid, an electric motor driven means for propelling said piston rod in the opposite direction, an electric circuit connected with said motor, an electric switch in said circuit, an abutment movable towards and away from said switch, means responsive to pressure induced by the fluid for moving said abutment in one direction, means moved by the electric motor driven means for moving the switch to cause the same to impinge against said abutment to effect actuation of the switch to thereby render the motor inactive and discontinue the movement of the piston rod thereby, and means operating independently of the said switch and functioning when the motor is inactive to permit said piston rod to be moved by its tension means so as to again effect actuation of the switch to render the motor active again and to thereby effect continual reciprocations of the piston rod at all positions of the abutment and when the pressure induced by the fluid remains static and unchanged.

3. In a control device, a reciprocatory rod shiftable in opposite directions and adapted to engage with a valve element for controlling the flow of a fluid, means normally tensioning said rod for movement in one direction, electric motor driven means for shifting said rod in the opposite direction, an electric circuit including said motor, a swingably mounted electric switch in said circuit, an abutment swingable towards and away from said switch, abutment position controlling means normally urged in one direction and responsive to pressure exerted by the fluid for moving the same in the opposite direction, means movable by and with said rod for effecting swinging of said switch into engagement with said abutment to thereby render the motor driven means inactive and to discontinue the movement of the rod thereby, and means functioning when the motor is inactive and the pressure exerted by the fluid to move said abutment is static to thereby permit said rod to be normally moved so as to effect the swinging of the switch to render the motor active again and intermittent in its operation.

4. In a control device, a reciprocatory rod shiftable in opposite directions and adapted to engage with a valve element for controlling the flow of a fluid, means normally tensioning said rod for movement in one direction, electric motor driven means for shifting said rod in the opposite direction, electric circuit including said motor, a swingable electric switch having relatively movable contact elements in said circuit, an abutment movable towards and away from the said switch, abutment position controlling means normally urged in one direction and responsive to pressure exerted by the fluid for moving the same in the opposite direction, means connected to and movable with said rod for effecting engagement of said switch with said abutment to move said contact elements to break the circuit and thereby discontinue the operation of said motor driven means and the movement of the rod in said opposite direction, and means operating independently of said switch and functioning when the motor is inactive to permit said rod to be normally moved so as to allow the switch to gravitationally swing to close said contact elements and render the motor active again and intermittent in its operation at any one of an infinite number of positions of the rod between the limits of its movement, said abutment being adjustable with reference to the position controlling means therefor to vary the range of change in the fluid at which the switch becomes effective to cause intermittent operation of the motor.

5. In a control device, a reciprocatory rod shiftable in opposite directions to limit positions and adapted to engage with a valve element for controlling the flow of a fluid, means normally tensioning said rod for movement in one direction, electric motor driven means for shifting said rod in the opposite direction, an electric circuit including said motor and an electric switch, a switch abutment element movable towards and away from said switch, abutment position controlling means normally urged in one direction and responsive to pressure exerted by the fluid from said valve for moving the same in the opposite direction, and means movable coincident with said rod for alternately effecting engagement of the switch with and disengagement of the same from said abutment to cause intermittent making and breaking of the circuit and reciprocation of the rod at any position between limits of its movement, and an adjustable leverage system interposed between the abutment position controlling means and the switch and with which the abutment element cooperates for rendering the device applicable to valves having varying degrees of valve plug travel.

6. In a control device, a reciprocatory rod shiftable in opposite directions to limit positions and adapted to engage with a valve element for controlling the flow of a fluid, means normally tensioning said rod for movement in one direction, electric motor driven means for shifting said rod in the opposite direction, an electric circuit including said motor and an electric switch, a switch abutment element, a pivoted yoke upon which said abutment element is mounted, an abutment positioning plunger normally urged in one direction and responsive to pressure exerted by the fluid from the valve for moving the same in the opposite direction to effect movement of the abutment element towards and away from the switch, and means carried by and movable with said rod for alternately effecting the engagement of the switch with and the disengagement of the same from said abutment element to cause intermittent making and breaking of the circuit and reciprocation of the rod at any position between limits of its movement and adapted to thereby cause said rod to sustain the valve in partially opened condition in accordance with the pressure exerted by the fluid from the valve.

7. In a control device, a reciprocatory piston rod normally tensioned for movement in one direction and adapted to engage with a valve element for controlling the flow of a fluid, means normally tensioning said piston rod for movement in one direction, a motor driven pressure creating means for propelling said piston rod in the opposite direction, an electric circuit connected with said motor, a swingably mounted electric switch in said circuit, a switch abutment element, a pivoted yoke upon which said abutment element is mounted, a reciprocatory member responsive to pressure induced by the fluid for swinging said yoke and abutment in one direction, means moved by said pressure creating means for swinging the switch to cause the same to impinge against said abutment to effect actuation of the switch to break the circuit and thereby discontinue the operation of said motor so as to arrest the travel of the piston rod, constantly open vent means operating independently of said switch and functioning when the motor is inactive to permit of the escape of the pressure created by said motor driven means to thereby allow said piston rod to be moved by said tension means so as to permit the swinging of the switch to close the circuit and to render the motor active again and intermittent in its operation at any position between the limits of its movement to thereby control the flow of the fluid through said valve, and a rod carried by said pivoted yoke and axially adjustable towards and away from said reciprocatory member for varying the position of the abutment to thereby vary the position at which the switch becomes effective to cause intermittent operation of the motor.

MILTON HILMER.
GEORGE SIGNAROVITZ.